Nov. 11, 1969  E. K. KOPPELMANN  3,477,319
RECESSING TOOL
Filed Aug. 16, 1965  2 Sheets-Sheet 2
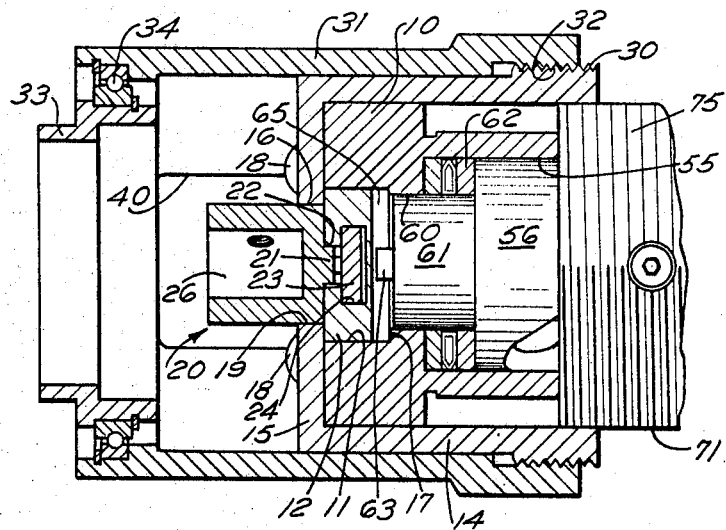
FIG. 2
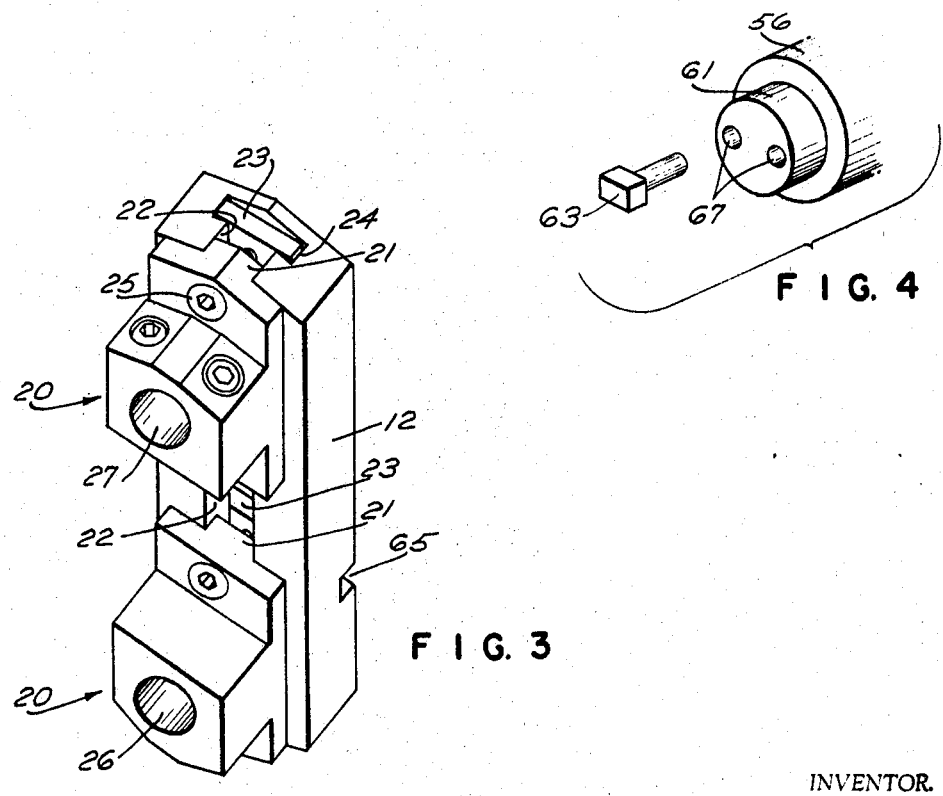
FIG. 3
FIG. 4
INVENTOR.
ELDO K. KOPPELMANN
BY
Barlow & Barlow
ATTORNEYS United States Patent Office 3,477,319
Patented Nov. 11, 1969

3,477,319
RECESSING TOOL
Eldo K. Koppelmann, Cumberland, R.I., assignor to Madison Industries, Inc., a corporation of Rhode Island
Filed Aug. 16, 1965, Ser. No. 479,956
Int. Cl. B23b 3/00, 21/00, 47/00
U.S. Cl. 82—1                 4 Claims

ABSTRACT OF THE DISCLOSURE

A tool for forming an annular recess in a hole or on the outer surface of a work piece in which there is a member slidably mounted to move radially of the axis of the tool and be actuated radially by relative axial movement of parts of the tool.

---

One manner of effecting a recess or undercut in a hole is to provide a rotating cutter which may be radially advanced from a retracted position, the radially outward movement of the cutter performing the necessary operation. To effect this radially outward movement of the cutter, it has been known in the prior art to provide helical slots through an eccentrically disposed cutter member by axially moving a cross pin carried by the body surrounding the cutter member. In this fashion axial movement of the body with respect to the cutter member effects rotation and because of the eccentric mounting shifts the cutter radially outward.

In recessing cutters of this general type, it has been usual to couple the recessing tool directly to the helical throw device. Sometimes this gives rise to chatter and wear on a number of parts that need not be concerned with the support of the cutting tool. Further with a tool of this general characer it is sometimes difficult to adjust the amount of stroke and simulaneously or concurrently therewith the position of the cutter with respect to the pilot guiding device.

It is accordingly one of the main objects of this invention to improve generally upon recessing tools.

Another object of the invention is to provide an adjustable coupling device between the eccentric throw and the cutter support head.

Another object of the invention is to provide a helical throw type of recessing tool combined with a diametrically disposed slide, the tool holder proper being rigidly connected to the slide at a location to provide a recess in the wall of a hole in the work or a recess in the outer surface of the work.

Another object of the invention is to provide a means to hold the device in engagement with the work during manipulation of the diametrically disposed slide.

With these and other objects in view, the invention consists of certain novel features of construction as will be more fully apparent and particularly pointed out in the appended claims.

In the drawings:

FIG. 1A is a similar sectional view of a continuation of the tool to the other end;

FIG. 2 is a section at right angles to FIG. 1;

FIG. 3 is a perspective view of the slide; and

FIG. 4 is a perspective view of the forward end of the feed shaft.

Figure 1:
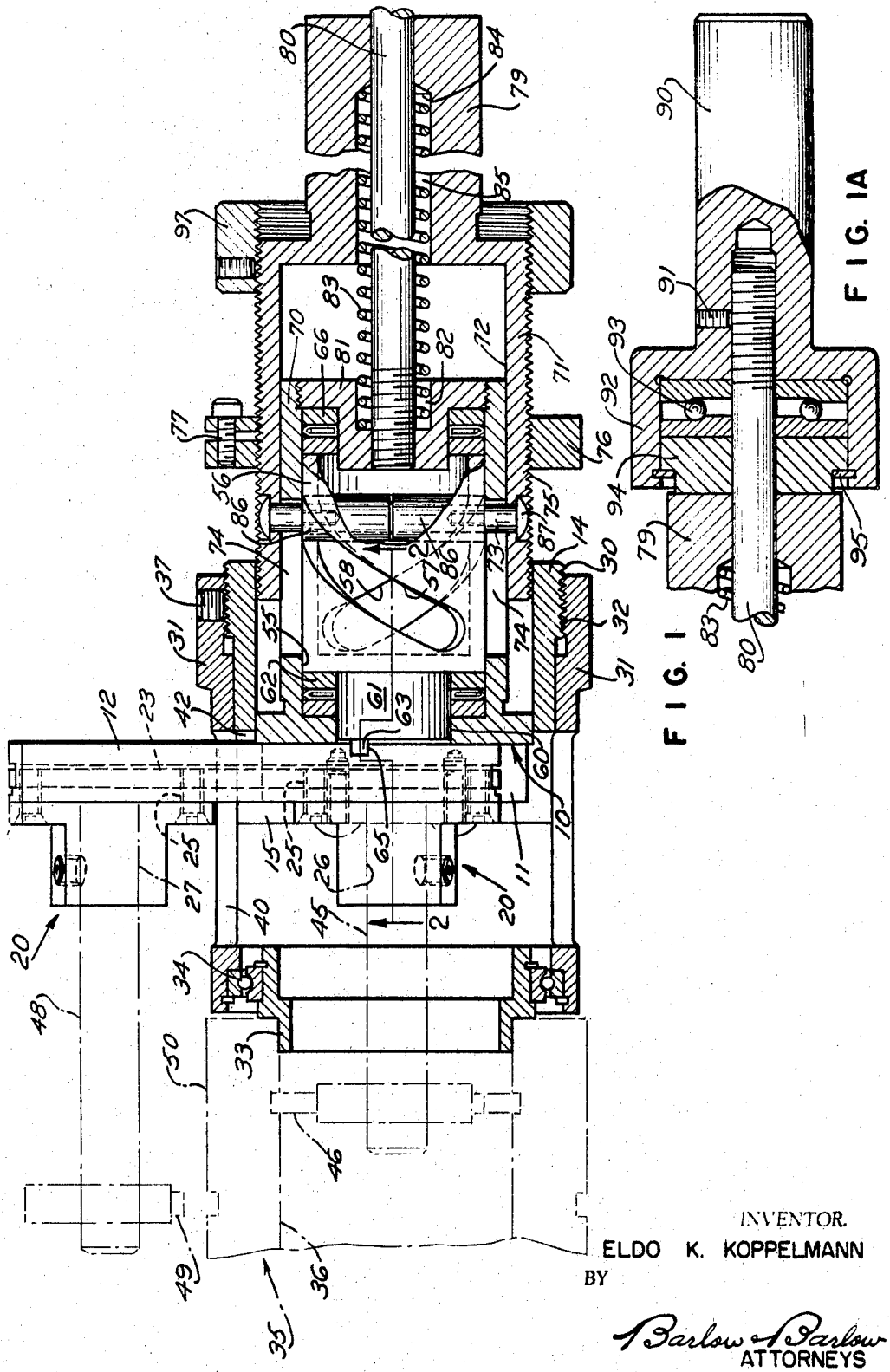
FIG. 1 is a longitudinal sectional view of the forward end of the recessing tool of the invention.

Referring more specifically to the drawings, 10 designates a cylindrical tool body which has a diametrical slot 11 at its forward end providing opposite side walls for guiding the slide 12 to move diametrically across the body. A retaining collar 14 having an end wall 15 overlaps the slot 11 as at 16 (FIG. 2) so as to provide guides for engaging the leading end of the slide 12 and preventing it from movement forward in the slot 11, while it is prevented from moving rearwardly in the slot by the wall 17 of the slot 11. This end wall 15 of the retaining collar is fastened securely to the body by means of screws 18 and is provided with a diametrical slot 19 parallel to slot 11 and of a width less than the width of the slot 11. In this slot 19 there is located the adjustable members 20, 20 of the slide 12 (FIG. 3). These members 20 of the slide 12 are each provided with a key 21 which fits into a slot 22 in the slide 12 and may move in this slot 22 in the slide 12 and may move in this slot 22 longitudinally of the slide 12. Each member 20 of the slide is held in adjusted position by means of a shoe 23 in the slot 24 of the slide which is of a width wider than the slot 22 and which may be drawn against the forward surface of the slot 24 by means of screws 25 threaded into the shoe 23 with the shouldered heads thereof against the outer surface of the member 20, thus holding the member 20 in adjusted position on the slide 12. Each member 20 is provided with recesses 26 in one and 27 in the other in either one or both of which a tool holder may be placed. The tool holders may thus be moved toward or from each other on the slide 12.

The retaining collar 14 is externally threaded as at 30 and a sleeve 31 for holding the pilot is threaded as at 32 so as to engage the threads 30 of the retaining collar. This sleeve projects the pilot forwardly of this collar, the relative position of the sleeve and collar being maintained by set screw 37. The sleeve 31 mounts the pilot 33 at the forward end thereof by means of ball bearings 34 so that the same may rotate easily upon the sleeve. The pilot engages the work 35 which has a bore or opening 36 therein, the inner wall of which may be desired to be worked upon. The sleeve 31 is provided with an opening 40 which registers with opening 42 in the retaining collar 14, both of the openings 40 and 42 extending across or on opposite sides of the center so as to provide a passageway for the slide 12 and members 20 mounted thereon for radial movement with reference to the body 10, collar 14 and sleeve 31. The members 20 of the slide 12 receive in the opening 26 a tool holder 45 for carrying a tool 46 for undercutting the bore of the work, while in the opening 27 a tool holder 48 may be provided carrying a tool 49 for recessing the outer surface of the work. By movement of the slide, these tools may be brought into engagement with the work 35, either on the inner surface of the hole 36 or on the outer surface 50 for providing recesses therein or by suitable adjustment of the members 20 both may at the same time engage the inner and outer surface of the work to recess the same.

The body 10 is provided with a bore 55 providing a bearing for the feed shaft 56 having helical slots 57 and 58 therein. At the forward end of the bore 55 there is similar bore 60 which rotatably mounts the cylindrical member 61. Roller bearings 62 encircle this member 61 and provide a thrust bearing for the forward end of the feed shaft 56 while a similar bearing 66 is provided at the rear end thereof. The member 61 is provided with a rotatable mounted key 63 (FIG. 4) eccentrically located on the member 61 in either opening 67. This key 63 enters a slot 65 in the slide 12 which extends across the slide, and thus when the member 61 rotates, the slide will be moved radially outwardly or inwardly depending upon the direction of rotation of the member 61.

The body 10 is reduced along the major portion of its length as at 70 and slidably receives a sleeve 71 having an inner surface 72 to slide along the body and enter between the reduced portion 70 of the body and the retaining collar 14 for axial movement relative to the body and retaining collar. The sleeve 71 carries a diametrically extending pin 73 upon which are rotatable bearings 86 which extends through helical slots 74 diametrically opposite each other in the body 10 and engages the side walls of the helical slots 57 and 58 so that when this pin is moved axially, a rotative action will be imparted to the feed shaft 56. The pin 73 is held in position by shoulder screws 87. This sleeve 71 is threaded along its outer surface as at 75 and receives a stop collar 76 which may be adjusted along this threaded surface and held in adjusted poistion by a clamp screw 77 so as to limit the amount that the sleeve may be slid axially with reference to the retaining collar and the body.

Sleeve 71 is provided with a drive shank 79 to be engaged for rotation of the device. A rod 80 extends through this sleeve and shank and threadedly engages plate 81 which is recessed as at 82 to provide a pocket for holding spring 83 which surrounds the rod 80 and which will be compressed between the bottom of this recess 82 and the shoulder 84 provided at the end of bore 85 which receives the spring and serves to be compressed as the sleeve is slid forwardly with reference to the body.

A member 90 is threaded onto rod 80 and fixed thereto by set screw 91. This member 90 is cupped at its inner end as at 92 and receives a thrust anti-friction bearing 93 and thrust plate 94 which engages the end of shank 79 and is held in position by snap ring 95. This arrangement permits of an auxiliary operation to preset the position of the recessing tool by rotation of the member 90 (which may be by hand) prior to machine operation on the work. The nut 97 is to adjust the position of the tool in the machine spindle.

It will be apparent that as the sleeve is moved forwardly with reference to the body, the feed shaft 56 will be rotated to rotate the member 61 and carry the slide with its tool holders radially outwardly or inwardly depending upon their location so as to engage the work and provide a recess therein.

I claim:
1. A recessing tool comprising a tool body, a slide diametrically slidably guided by said body, a sleeve axially slidably guided by said body, means coupling said sleeve to said slide to move the slide radially upon axial movement of the sleeve relative to said body, said slide having a radially extending guideway, at least one member slidably guided in said guideway, means to secure said member to said slide at an infinite number of positions along said guideway, said member carrying means for mounting a tool holder, whereby the range of radial adjustment of the tool holder may be varied.

2. A recessing tool as in claim 1 wherein said slide carries a plurality of tool holder mountings.

3. A recessing tool as in claim 1 wherein said slide carries a plurality of tool holder mountings each independently radially adjustable.

4. A recessing tool as in claim 1 wherein said slide has has a T-shape guideway and said member has a thread to move in said T-shape guideway.

References Cited
UNITED STATES PATENTS

| | | | |
|---|---|---|---|
| 1,193,426 | 8/1916 | Rollinson et al. | 82—1 |
| 1,249,642 | 12/1917 | Lindfors | 82—2.6 X |
| 2,365,549 | 12/1944 | Haynes | 77—58 |
| 2,601,541 | 6/1952 | Maxwell | 77—58 |

LEONIDAS VLACHOS, Primary Examiner

U.S. Cl. X.R.
77—58; 82—24